(12) United States Patent
Fioravanti (10) Patent No.: US 9,396,126 B2
(45) Date of Patent: Jul. 19, 2016

(54) CLEARING AN APPLICATION CACHE

(71) Applicant: Google Inc., Mountain View, CA (US)

(72) Inventor: Ryan James Fioravanti, Kitchener (CA)

(73) Assignee: Google Inc., Mountain View, CA (US)

( * ) Notice: Subject to any disclaimer, the term of this patent is extended or adjusted under 35 U.S.C. 154(b) by 399 days.

(21) Appl. No.: 13/754,764

(22) Filed: Jan. 30, 2013

(65) Prior Publication Data

US 2015/0199278 A1 Jul. 16, 2015

(51) Int. Cl.
*G06F 15/16* (2006.01)
*G06F 12/08* (2016.01)

(52) U.S. Cl.
CPC .................................. *G06F 12/0891* (2013.01)

(58) Field of Classification Search
USPC .......................................................... 709/217
See application file for complete search history.

(56) References Cited

U.S. PATENT DOCUMENTS

| | | | | |
|---|---|---|---|---|
| 6,314,492 | B1 * | 11/2001 | Allen | G06F 17/30902 707/E17.12 |
| 7,765,196 | B2 * | 7/2010 | Papanyan | G06F 17/30902 707/615 |
| 8,234,348 | B1 * | 7/2012 | Tulchinsky et al. | 709/214 |
| 2007/0033155 | A1 * | 2/2007 | Landsman | 707/1 |
| 2007/0033588 | A1 * | 2/2007 | Landsman | G06F 17/30899 717/178 |
| 2007/0118844 | A1 * | 5/2007 | Huang et al. | 719/330 |
| 2009/0043867 | A1 * | 2/2009 | Sharp et al. | 709/218 |
| 2010/0070448 | A1 * | 3/2010 | Omoigui | 706/47 |
| 2010/0162126 | A1 * | 6/2010 | Donaldson et al. | 715/738 |
| 2012/0084346 | A1 * | 4/2012 | Mickens | 709/203 |
| 2012/0166526 | A1 * | 6/2012 | Ambardekar | 709/203 |
| 2013/0060885 | A1 * | 3/2013 | Fu | 709/217 |
| 2013/0318208 | A1 * | 11/2013 | Seshadri et al. | 709/219 |
| 2013/0346872 | A1 * | 12/2013 | Scott | G06F 17/3064 715/738 |
| 2014/0109076 | A1 * | 4/2014 | Boone et al. | 717/170 |
| 2014/0207566 | A1 * | 7/2014 | Kamran et al. | 705/14.45 |

* cited by examiner

*Primary Examiner* — Kevin Bates
*Assistant Examiner* — Ronak Patel
(74) *Attorney, Agent, or Firm* — McDermott Will & Emery LLP (57) ABSTRACT

A system and machine-implemented method for clearing an application cache. A request for a manifest file is received from an electronic device, the manifest file indicating a current version of application resources for loading web content offline. A determination is made if the request includes a first instruction for clearing an application cache on the electronic device, the application cache comprising a stored version of application resources for loading web content offline. In a case where the request includes the first instruction, a second instruction is transmitted to the electronic device, the second instruction for instructing the electronic device to clear the application cache.

20 Claims, 5 Drawing Sheets

CLEARING AN APPLICATION CACHE

BACKGROUND

The present disclosure generally relates to an application cache and, in particular, to clearing an application cache.

Some web browsers use an application cache to store application resources for loading web content offline. The application cache can be cleared by a server returning an instruction (e.g., an HTTP 404 message) to the manifest request. However, this will clear the application for the website, and the decision is made by the server.

SUMMARY

The disclosed subject matter relates to a machine-implemented method of clearing an application cache. The method comprises receiving a request for a manifest file from an electronic device, the manifest file indicating a current version of application resources for loading web content offline. The method further comprises determining if the request includes a first instruction for clearing an application cache on the electronic device, the application cache comprising a stored version of application resources for loading web content offline. In addition the method comprises transmitting, in a case where the request includes the first instruction, a second instruction to the electronic device, the second instruction for instructing the electronic device to clear the application cache.

The disclosed subject matter further relates to a system for clearing an application cache. The system comprises one or more processors, and a machine-readable medium comprising instructions stored therein, which when executed by the processors, cause the processors to perform operations comprising receiving a request for a manifest file from an electronic device, the manifest file indicating a current version of application resources for loading web content offline. The operations further comprise determining if the request includes a first instruction for clearing an application cache on the electronic device, the application cache comprising a stored version of application resources for loading web content offline. In addition, the operations comprise transmitting, in a case where the request includes the first instruction, a second instruction to the electronic device, the second instruction for instructing the electronic device to clear the application cache, and transmitting, in a case where the request does not include the first instruction, the manifest file to the electronic device.

The disclosed subject matter also relates to a machine-implemented method of clearing an application cache. The method comprises determining if an application cache on an electronic device is to be cleared, the application cache comprising a stored version of application resources for loading web content offline. The method further comprises, in a case where the application cache is determined to be cleared, transmitting a request for a manifest file to a server, the request including a first instruction for clearing an application cache on the electronic device, the manifest file indicating a current version of application resources for loading web content offline, receiving, in response to the transmitted request, a second instruction from the server, the second instruction for instructing the electronic device to clear the application cache, and clearing, in response to the received second instruction, the application cache.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, some web browsers use an application cache. As used herein, "application cache" encompasses its plain and ordinary meaning, including but not limited to, a software storage feature which provides the ability to access a web application offline. The application cache enables webpages to cache (or save) resources locally. For example, the resources can include, but are not limited to, images, script libraries, and style sheets. The application cache allows URLs to be served from cached content using standard Uniform Resource Identifier (URI) notation. In example aspects, the application cache corresponds, but is not limited, to the cache manifest in HTML5.

One problem with the application cache is that there is no programmatic API for clearing the application cache associated with a webpage. The application cache in a browser is typically cleared by returning an instruction (e.g., an HTTP 404 message) to the manifest request. However, this will unconditionally clear the application for the website, and the decision is made by the server. Furthermore, in some cases, the site owner may only want to clear the cache for certain client browsers, such as those that have exceeded a quota for the application cache or have reached an undesirable (e.g., erroneous) state for the cache. Thus, it may be desirable for a client device to initiate the clearing of the application cache.

The subject technology provides for clearing an application cache. A server receives a request for a manifest file from an electronic device. The server determines if the request includes a first instruction (e.g., a cookie or a query parameter set by the electronic device) for clearing the application cache on the electronic device. In a case where the request includes the first instruction, the server sends a second instruction (e.g., an HTTP 404 message) to the electronic device, the second instruction for instructing the electronic device to clear the application cache. In a case where the request does not include the first instruction, the server sends the manifest file to the electronic device, the manifest file indicating a current version of the application resources for loading web content offline.

Figure 1:
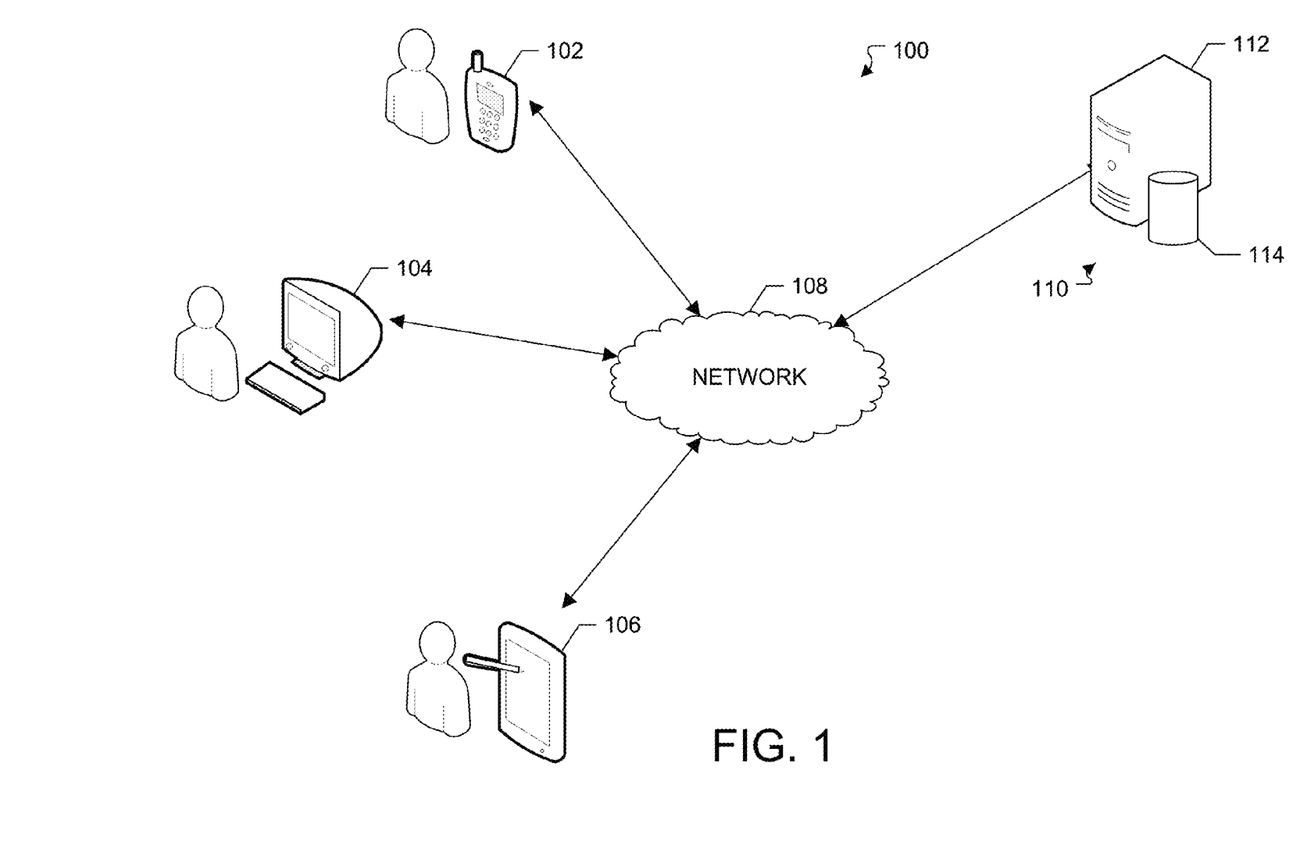
FIG. 1 illustrates an example network environment which can provide for clearing an application cache.

FIG. 1 illustrates an example network environment which can provide for clearing an application cache. A network environment 100 includes computing devices 102, 104 and 106 and computing system 110. Computing devices 102-106 and computing system 110 can communicate with each other through a network 108. Computing system 110 can include one or more computing devices 112 (e.g., one or more servers), respectively, and one or more computer-readable storage devices 114 (e.g., one or more databases), respectively.

Each of computing devices 102-106 can represent various forms of processing devices. Example processing devices include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

In example aspects, any of computing devices 102-106 transmits a request for a manifest file to server 110, and server 110 receives the request. The manifest file indicates a current version of application resources for loading web content offline. Server 110 determines if the request includes a first instruction for clearing an application cache on the computing device, where the application cache includes a stored version of application resources for loading web content offline.

In a case where the request includes the first instruction, server 110 transmits a second instruction (e.g., a cookie or a query parameter) to the computing device (e.g., any of 102-106), the second instruction for instructing the computing device to clear the application cache. The computing device receives the second instruction, and clears the application cache based on the second instruction. In a case where the request does not include the first instruction, server 110 transmits the manifest file to the computing device (e.g., any of 102-106), and the computing device receives the manifest file.

Figure 2A:
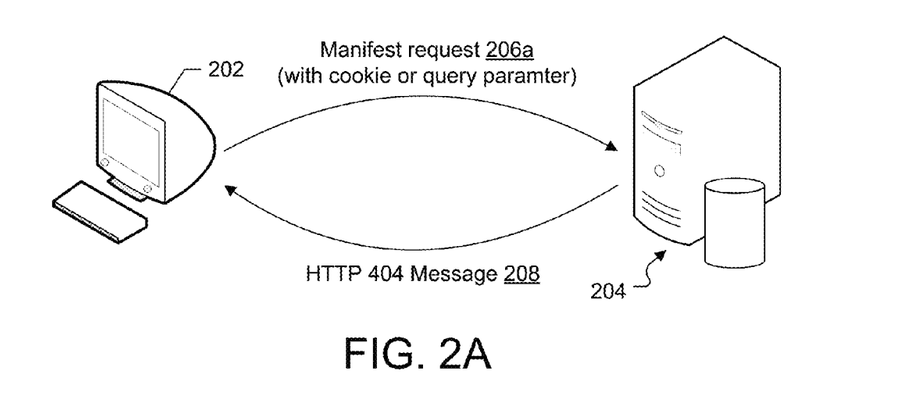
FIGS. 2A-2B illustrate examples of client-server communication for clearing an application cache.
Figure 2B:
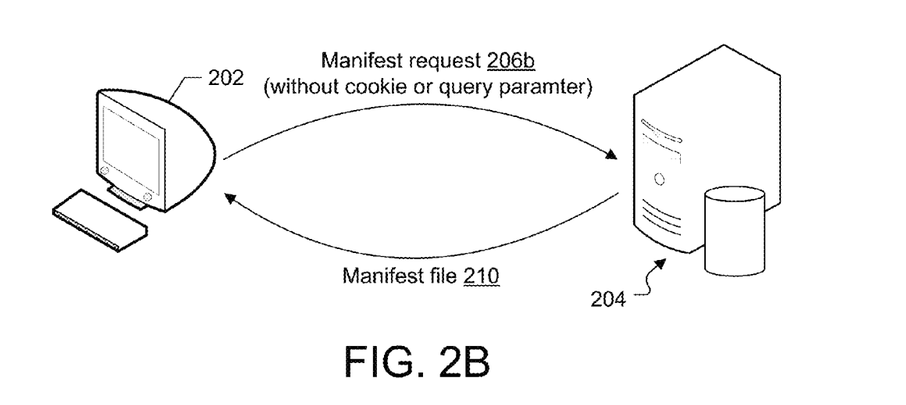

FIGS. 2A-2B illustrate examples of client-server communication for clearing an application cache. In these examples, communication between a computing device 202 (e.g., any of computing devices 102-106) and a server 204 (e.g., server 110) over a network (e.g., network 108) is illustrated.

A web browser running on computing device 202 includes an application cache, which provides the ability to access a web application offline. A description of populating the application cache on computing device 202 will now be provided. The web browser running on computing device 202 will first request a webpage from server 204. The web browser downloads the page and the resources (e.g., images, script libraries, and style sheets) for the webpage, and renders the page. It should be noted that although the use of a web browser is described herein, the subject technology is not limited to web browsers. The subject technology can apply to any application for accessing web content online.

The webpage (e.g., the HTML of the webpage) may or may not contain a link to a manifest file, which indicates the application resources for loading web content offline. If the webpage does contain a link to the manifest file, the browser downloads the manifest file, and further downloads all of the resources identified by the manifest file for loading web content offline. The downloaded resources are stored into the application cache, thereby populating the application cache. Thus, the resources for loading web content are stored offline, in the application cache.

After the application cache has been populated, and the next time the browser on computing device 202 accesses the webpage from server 204, the web browser can load the resources from the application cache and render the webpage. The web browser can request the manifest file from server 204. In response, server 204 can return either the manifest file or an HTTP 404 message.

In the case where server 204 returns the manifest file, the manifest file can either identify the same resources as already stored in the application cache, or can identify different resources (e.g., if there have been updates to the webpage). If the manifest file indicates the same resources, the web browser can continue to show the cached resources. On the other hand, if the manifest file indicates different resources, the web browser on computing device 202 can download the new cacheable resources from server 204, and can update the application cache with the new resources. In example aspects, the web browser can continue rendering the old content, and can use the new resources when accessing the same webpage at a later time.

In the case where server 204 returns an HTTP 404 message, computing device 202 will automatically clear the application cache. In example aspects, the clearing of the application cache in response to receiving the HTTP 404 message is part of the application cache specification (e.g., part of the HTML5 specification). As such, server 204 can determine that the application cache should be cleared for all web browsers (e.g., for multiple computing devices) accessing a webpage. When such a determination is made, server 204 returns the HTTP 404 message to instruct the web browsers to clear their respective application caches.

However, in some instances, the computing device itself (e.g., computing device 202) may wish to clear its version of the application cache. For example, the application cache may exceed its quota for memory. In this regard, the application cache has a quota associated therewith, and computing device 202 can detect when this quota has been reached. In another example, an undesirable state can be reached when the application cache has cached pages which are undesirable. In this regard, computing device 202 can detect when a page is undesirable, and can further detect when such an undesirable page is cached in the application cache.

After determining that the application cached should be cleared, computing device 102 can provide an instruction, together with the request for the manifest file, to server 204. The instruction indicates to server 204 that server 204 should return the HTTP 404 message. For example, server 204 can include a manifest handler, which checks for the existence of the instruction in the request for the manifest file. If the manifest handler detects the instruction, server 404 sends the HTTP 404 message to the computing device, thereby causing the computing device to perform a clearing of the application cache.

FIG. 2A illustrates an example in which computing device 202 determines that the application cache should be cleared. As can be seen in FIG. 2A, computing device sends a request for a manifest file, namely manifest request 206*a*, to server 204. Manifest request 206*a* includes an instruction that server 204 should return an HTTP 404 message. For example, the instruction can be in the form of a cookie set at computing device 202.

Alternatively, or in addition, the instruction can be in the form of a query parameter set at computing device 202. For example, manifest request 206*a* corresponds to a link (e.g., URL) to a manifest file. The link can be modified to include the query parameter, by appending the query parameter to the link. For example, given the URL "www.xyz.com," a query parameter of "/manifest?resetappcache=true" can be appended to form a modified URL of "www.xyz.com/manifest?resetappcache=true." Server 204 can receive the link "www.xyz.com/manifest?resetappcache=true" as the request for a manifest file (e.g., manifest request 206*a*), and can detect that the query parameter indicates to clear the application cache. In response, server sends the HTTP 404 message 208 to computing device 202.

In example aspects, the instruction to clear the application cache, sent from computing device 202 to server 204, can be in the form of an XMLHttpRequest (XHR) instruction. The XHR instruction is generated on computing device 202, and indicates to server 204 that the application cache for computing device 202 should be cleared. The XHR instruction is sent from computing device 202 to server 204 at any time prior to sending the manifest request 206*a*. Server 204, in turn, locally saves an indication to return the HTTP 404 message upon receipt of the manifest request (e.g., manifest request 206*a*) from client 202. In example aspects, if multiple servers are hosting an application, the indication stored in response to the XHR instruction is saved across all of the servers, so that any of the servers can check for the indication and determine to return the HTTP 404 message.

Upon receiving the instruction (e.g., in the form of a cookie, query parameter, or an XHR instruction) to clear the application cache, server 204 returns HTTP 404 message 208. Computing device 202 receives HTTP 404 message 208, thus triggering computing device 202 to clear its application cache.

FIG. 2B illustrates an example in which computing device 202 does not determine that the application cache should be cleared. For example, computing device 202 may determine that the stored version of the application cache has not exceeded its quota and/or has not cached any undesirable pages. Accordingly, computing device sends the request for the manifest file, namely manifest request 206*b*, to server 204. Manifest request 206*b* can correspond to a link to the manifest file. In addition, manifest request 206*b* does not include the instruction indicating that the application cache is to be cleared. In response, server 204 returns the manifest file 210.

As noted above, in the case where server 204 returns manifest file 210, manifest file 210 can either identify the same resources as already stored in the application cache, or can identify different resources (e.g., if there have been updates to the webpage). If the manifest file indicates the same resources, the web browser can continue to show the cached resources. On the other hand, if the manifest file indicates different resources, this corresponds to a mismatch between the current version of the manifest file and the stored version of resources in the application cache of computing device 202. In this case, the web browser on computing device 202 can download the new cacheable resources from server 204, and can update the application cache with the new resources. In example aspects, the web browser can continue rendering the old content, and can use the new resources when accessing the same webpage at a later time.

Thus, as can be seen in FIGS. 2A-2B, the subject technology provides for the creation of a protocol between a computing device (e.g., a client) and server. This protocol allows the computing device to communicate when the server should return a message to clear the application cache.

Figure 3:
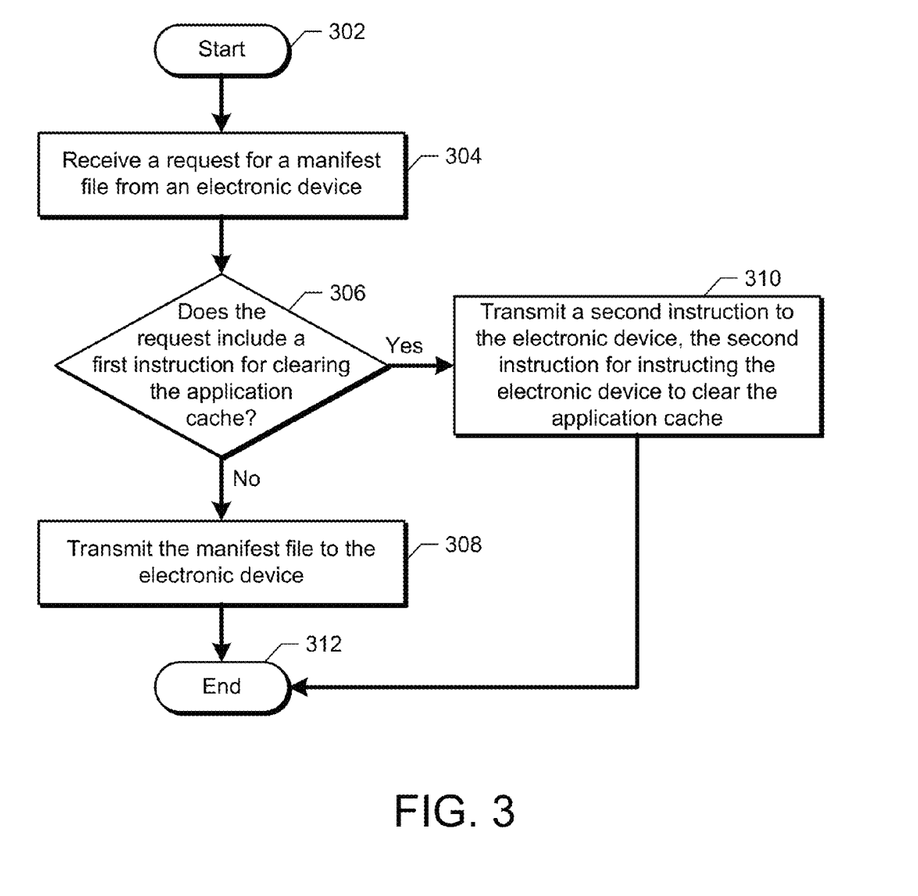
FIG. 3 illustrates an example process by which an application cache is cleared by a server.

FIG. 3 illustrates an example process by which an application cache is cleared by a server. Following start block 302, a request for a manifest file is received from an electronic device at step 304. The manifest file indicates a current version of application resources for loading web content offline. The request for the manifest file can be based on a link provided within HTML on the electronic device, the HTML for loading the web content offline.

At decision step 306, an inquiry is made as to whether the request includes a first instruction for clearing an application cache on the electronic device. The application cache includes a stored version of application resources for loading web content offline. The first instruction can include a cookie indicating to clear the application cache on the electronic device. Alternatively, or in addition, the first instruction can include a query parameter indicating to clear the application cache on the electronic device, the query parameter being included within a URL corresponding to the request for the manifest file.

If the answer to the inquiry at decision step 306 is yes, a second instruction is transmitted to the electronic device at step 310. The second instruction instructs the electronic device to clear the application cache. The second instruction can include an HTTP 404 message.

Prior to receiving the request for the manifest file, an XMLHttpRequest (XHR) instruction can be received from the electronic device, the XHR instruction indicating to clear the application cache on the electronic device. A determination can be made that the XHR instruction was received prior to receiving the request for the manifest file. Based on the determination that the XHR instruction was received prior to receiving the request for the manifest file, the second instruction can be transmitted to the electronic device.

If the answer to inquiry at decision step 306 is no, the manifest file is transmitted to the electronic device at step 308. A request for the current version of application resources can be received from the electronic device, where the current version of application resources is based on the indication from the manifest file. This request can be based on a mismatch between the current version of application resources and the stored version of application resources. The current version of application resources can be transmitted to the electronic device in response to this request. The process then ends at end block 310.

Figure 4:
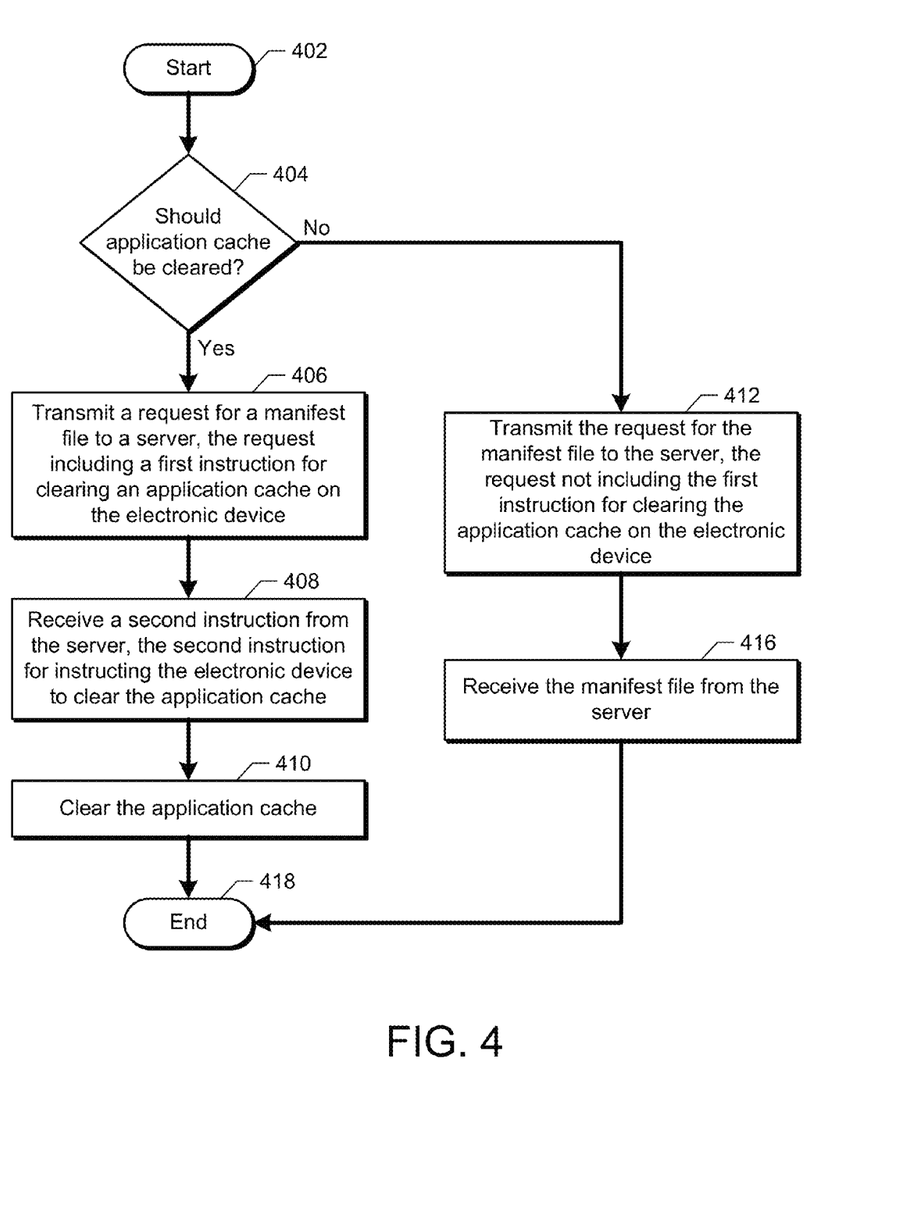
FIG. 4 illustrates an example process by which an application cache is cleared by a client device.

FIG. 4 illustrates an example process by which an application cache is cleared by a client device. Following start block 402, an inquiry is made as to whether an application cache on an electronic device is to be cleared at decision step 404. The application cache includes a stored version of application resources for loading web content offline.

If the answer to the inquiry at decision step 404 is yes, a request for a manifest file is transmitted to a server at step 406. The request for the manifest file can be based on a link provided within HTML on the electronic device, the HTML for loading the web content offline. The request includes a first instruction for clearing an application cache on the electronic device, and the manifest file indicates a current version of application resources for loading web content offline.

The first instruction can include a cookie indicating to clear the application cache on the electronic device. Alternatively, or in addition, the first instruction can include a query parameter indicating to clear the application cache on the electronic device, the query parameter being included within a URL corresponding to the request for the manifest file.

In response to the transmitted request from step 406, a second instruction is received from the server at step 408, the second instruction for instructing the electronic device to clear the application cache. The second instruction can include an HTTP 404 message. In response to the received second instruction, the application cache is cleared at step 410.

Alternatively, prior to transmitting the request for the manifest file, an XMLHttpRequest (XHR) instruction can be transmitted to the server. The XHR instruction indicates to clear the application cache on the electronic device. In response to transmitting the XHR instruction, the second instruction can be received from the server, and the application cache is cleared.

If the answer to the inquiry at decision step 404 is no, the request for the manifest file is transmitted to the server at step 412. The request does not include the first instruction for clearing the application cache on the electronic device. In response to transmitting the request, the manifest file is received from the server at step 416.

A determination can be made that there is a mismatch between the current version of application resources and the stored version of application resources, where the current version of application resources is based on the indication from the manifest file. In response to determining the mismatch, a request for the current version of application resources can be transmitted to the server. In response to the transmitted request for the current version of application resources, the current version of application resources can be received from the server. The received current version of application resources can be stored in the application cache. The process then ends at end block 418.

Figure 5:
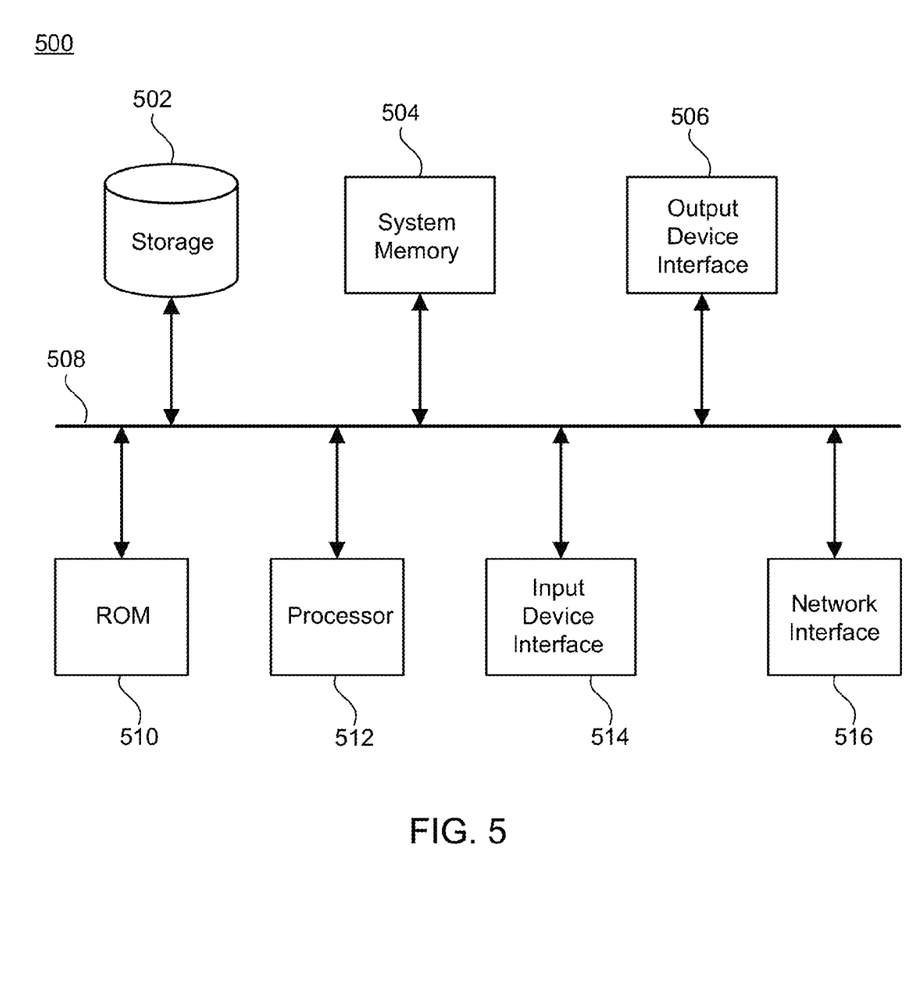
FIG. 5 conceptually illustrates an example electronic system with which some implementations of the subject technology can be implemented.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 502.

Other implementations use a removable storage device (for example, a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units include instructions for clearing an application cache in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a local area network ("LAN"), a wide area network ("WAN"), or an Intranet, or a network of networks, for example, the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A machine-implemented method of clearing an application cache, the method comprising:
   receiving a request for a manifest file from a first electronic device, the manifest file indicating a current version of application resources for loading web content offline;
   determining that the request received by a second electronic device includes a first instruction for clearing an application cache on the first electronic device, the application cache comprising a stored version of application resources for loading web content offline; and
   providing, for transmission, in response to the determining that the request includes the first instruction, a second instruction to the first electronic device, the second instruction being provided by the second electronic device for instructing the first electronic device to clear the application cache.

2. The method of claim 1, further comprising:
   transmitting, in a case where the request does not include the first instruction, the manifest file to the first electronic device.

3. The method of claim 2, further comprising:
   receiving a request for the current version of application resources from the first electronic device, the current version of application resources being based on the indication from the manifest file, wherein the request is based on a mismatch between the current version of application resources and the stored version of application resources; and
   transmitting, in response to the request for the current version of application resources, the current version of application resources to the first electronic device.

4. The method of claim 1, wherein the request for the manifest file is based on a link provided within HTML on the first electronic device, the HTML for loading the web content offline.

5. The method of claim 1, wherein the first instruction comprises a cookie indicating to clear the application cache on the first electronic device.

6. The method of claim 1, wherein the first instruction comprises a query parameter indicating to clear the application cache on the first electronic device, the query parameter being included within a URL corresponding to the request for the manifest file.

7. The method of claim 1, further comprising:
   receiving, prior to receiving the request for the manifest file, an XMLHttpRequest (XHR) instruction from the first electronic device, the XHR instruction indicating to clear the application cache on the first electronic device;
   determining that the XHR instruction was received prior to receiving the request for the manifest file; and
   transmitting, based on the determination that the XHR instruction was received prior to receiving the request for the manifest file, the second instruction to the first electronic device.

8. The method of claim 1, wherein the second instruction comprises an HTTP 404 message.

9. A system for clearing an application cache, the system comprising:
   one or more processors; and
   a machine-readable medium comprising instructions stored therein, which when executed by the processors, cause the processors to perform operations comprising:

receiving a request for a manifest file from a first electronic device, the manifest file indicating a current version of application resources for loading web content offline;

determining that the request received by a second electronic device includes a first instruction for clearing an application cache on the first electronic device, the application cache comprising a stored version of application resources for loading web content offline;

transmitting, in response to the determining that the request includes the first instruction, a second instruction to the first electronic device, the second instruction being provided by the second electronic device for instructing the first electronic device to clear the application cache; and transmitting, in a case where the request does not include the first instruction, the manifest file to the first electronic device.

10. The system of claim 9, wherein the first instruction comprises a cookie indicating to clear the application cache on the first electronic device.

11. The system of claim 9, wherein the first instruction comprises a query parameter indicating to clear the application cache on the first electronic device, the query parameter being included within a URL corresponding to the request for the manifest file.

12. The system of claim 9, wherein the second instruction comprises an HTTP 404 message.

13. A machine-implemented method of clearing an application cache, the method comprising:

determining if an application cache on an electronic device is to be cleared, the application cache comprising a stored version of application resources for loading web content offline; and in a case where the application cache is determined to be cleared:

transmitting a request for a manifest file to a server, the request including a first instruction by the electronic device for clearing an application cache on the electronic device, the manifest file indicating a current version of application resources for loading web content offline;

receiving, in response to the transmitted request, a second instruction from the server, the second instruction for instructing the electronic device to clear the application cache; and clearing, in response to the received second instruction, the application cache.

14. The method of claim 13, further comprising, in a case where the application cache is determined not to be cleared:

transmitting the request for the manifest file to the server, the request not including the first instruction for clearing the application cache on the electronic device; and receiving, in response to transmitting the request, the manifest file from the server.

15. The method of claim 14, further comprising:

determining that there is a mismatch between the current version of application resources and the stored version of application resources, the current version of application resources being based on the indication from the manifest file;

transmitting, in response to determining the mismatch, a request for the current version of application resources to the server;

receiving, in response to the transmitted request for the current version of application resources, the current version of application resources from the server; and storing the received current version of application resources in the application cache.

16. The method of claim 13, wherein the request for the manifest file is based on a link provided within HTML on the electronic device, the HTML for loading the web content offline.

17. The method of claim 13, wherein the first instruction comprises a cookie indicating to clear the application cache on the electronic device.

18. The method of claim 13, wherein the first instruction comprises a query parameter indicating to clear the application cache on the electronic device, the query parameter being included within a URL corresponding to the request for the manifest file.

19. The method of claim 13, further comprising:

transmitting, prior to transmitting the request for the manifest file, an XMLHttpRequest (XHR) instruction to the server, the XHR instruction indicating to clear the application cache on the electronic device;

receiving, in response to transmitting the XHR instruction, the second instruction from the server; and clearing, in response to the received second instruction, the application cache.

20. The method of claim 13, wherein the second instruction comprises an HTTP 404 message.

* * * * *